United States Patent [19]

Doi et al.

[11] Patent Number: 5,060,818
[45] Date of Patent: Oct. 29, 1991

[54] HEAT-RESISTANT LINER-PROVIDED VESSEL CLOSURE AND PROCESS FOR PREPARATION THEREOF

[75] Inventors: Kouichi Doi, Yokohama; Junichi Itsubo; Hiroaki Kikuchi, both of Hiratsuka, all of Japan

[73] Assignee: Japan Crown Cork Co., Ltd., Tokyo, Japan

[21] Appl. No.: 652,500

[22] Filed: Feb. 11, 1991

Related U.S. Application Data

[63] Continuation of Ser. No. 357,500, May 26, 1989, abandoned.

[30] Foreign Application Priority Data

Aug. 8, 1988 [JP] Japan ............... 63-196168

[51] Int. Cl.⁵ ............................. B65D 45/02
[52] U.S. Cl. ................... 220/454; 220/359; 525/98
[58] Field of Search .............. 220/454, 359; 525/98; 523/100

[56] References Cited

U.S. PATENT DOCUMENTS

| | | | |
|---|---|---|---|
| 3,950,280 | 4/1976 | Singleton | 523/100 |
| 4,332,846 | 6/1982 | Fischer | 220/359 |
| 4,428,494 | 1/1984 | Hirota | 220/260 |
| 4,560,727 | 12/1985 | Crossan | 525/98 |
| 4,775,711 | 10/1988 | Kawamura | 525/98 |
| 4,785,043 | 11/1988 | Kawai et al. | 525/98 |
| 4,810,541 | 3/1989 | Newman | 220/359 |
| 4,822,653 | 4/1989 | Kauffman | 525/98 |
| 4,828,136 | 5/1989 | Kawahara | 220/270 |
| 4,977,003 | 12/1990 | Brown et al. | 220/359 |

FOREIGN PATENT DOCUMENTS

| | | | |
|---|---|---|---|
| 2802966 | 7/1978 | Fed. Rep. of Germany | 525/98 |
| 158276 | 9/1982 | Japan | 523/100 |
| 8707903 | 12/1987 | World Int. Prop. O. | 525/98 |

*Primary Examiner*—Stephen Marcus
*Assistant Examiner*—S. Castellano
*Attorney, Agent, or Firm*—Sughrue, Mion, Zinn, Macpeak & Seas

[57] ABSTRACT

Disclosed is a vessel closure having a liner formed from a composition comprising (i) a hydrogenated styrene-/butadiene block copolymer having a melt index smaller than 0.1 g/10 min as measured at a temperature of 200° C. under a load of 5 kg, (ii) liquid paraffin and (iii) a propylene resin.

In this liner, the compression permanent strain and permanent elongation under high temperature conditions are extremely small, and therefore, even if a divergence is produced between the liner and the mouth portion of a vessel by thermal deformation or thermal shrinkage, a good sealing property can be maintained.

11 Claims, 1 Drawing Sheet

HEAT-RESISTANT LINER-PROVIDED VESSEL CLOSURE AND PROCESS FOR PREPARATION THEREOF

This is a continuation of application Ser. No. 07/357,500 filed May 26, 1989, now abandoned.

BACKGROUND OF THE INVENTION

(1) Field of the Invention

The present invention relates to a heat-resistant liner-provided vessel closure and a process for the preparation thereof. More specifically, the present invention relates to a heat-resistant liner-provided vessel closure which can resist hot filling of a content and heat sterilization after filling and sealing and in which leakage caused by thermal deformation or thermal shrinkage is prevented, and also to a process for the preparation of this vessel closure.

(2) Description of the Related Art

A vessel closure provided with a liner of an olefin resin such as low-density polyethylene formed on the inner face side of a top plate of a vessel closure shell has been widely used as a vessel closure having excellent sanitary characteristics and sealing characteristics. However, in the case where a heat treatment such as heating sterilization is carried out after filling of a content, excessive reduction of the opening torque and stress cracking are caused.

As the means for solving this problem, Japanese Unexamined (Kokai) Patent Publication No. 58-183458 proposes the use of a hydrogenation product of a block copolymer of an alkenyl aromatic hydrocarbon (such as styrene) and a conjugated diene (such as butadiene) or a blend of this hydrogenation product and a polyolefin for the liner of a vessel closure.

This blend of the hydrogenated block copolymer and polyolefin is advantageous in that reduction of the opening torque after the heat treatment is small and stress cracking resistance is improved, but this liner is still insufficient in the heat resistance, especially the resistance to leakage caused by thermal deformation or thermal shrinkage of the vessel opening.

More specially, the blend according to the conventional technique can resist a heat treatment conducted at 80° C. for 20 minutes, but it has been found that leakage is caused at a considerable frequency when a content is hot-filled at 95° C. and a shower treatment is carried out for 3 minutes with hot water maintained at 90° C.

The reason has not sufficiently been elucidated, but it is construed that although the hydrogenated block copolymer is relatively excellent in the heat resistance among thermoplastic elastomers, the compression permanent strain or permanent elongation in the above-mentioned high-temperature region is large and a divergence that cannot be neglected is produced between the vessel mouth and the vessel closure by thermal deformation or thermal shrinkage, with the result that fine spaces are formed in the sealed portion.

SUMMARY OF THE INVENTION

It is therefore a primary object of the present invention to provide a heat-resistant liner-provided vessel closure which can resist hot filling of a content and heat sterilization after filling and sealing while overcoming the defects of the conventional techniques and in which leakage caused by thermal deformation or thermal shrinkage can be effectively prevented.

Another object of the present invention is to provide a vessel closure provided with a liner in which generation of the compression permanent strain or permanent elongation at a heat sterilization temperature is controlled and a process for the preparation of this vessel closure.

In accordance with one fundamental aspect of the present invention, there is provided a liner-provided vessel closure comprising a vessel closure shell and a liner formed on the inner face side of a top plate of the shell, wherein the liner is formed from a composition comprising (i) 10 to 60% by weight of a hydrogenated styrene/butadiene block copolymer having a melt index smaller than 0.1 g/10 min as determined at a temperature of 200° C. under a load of 5 kg, (ii) 20 to 80% by weight of liquid paraffin and (iii) 5 to 60% by weight of a propylene resin.

In accordance with another fundamental aspect of the present invention, there is provided a process for the preparation of a heat-resistant liner-provided vessel closure, which comprises applying a composition comprising (i) 10 to 60% by weight of a hydrogenated styrene/butadiene block copolymer having a melt index smaller than 0.1 g/10 min as determined at a temperature of 200° C. under a load of 5 kg, (ii) 20 to 80% by weight of liquid paraffin and (iii) 5 to 60% by weight of a propylene resin in the softened or molten state to the inner face side of a top plate of a vessel closure shell and pressing the applied composition by the surface of a mold being cooled to shape the composition into a liner.

BRIEF DESCRIPTION OF THE DRAWING

In FIG. 1, 1 is a top plate portion, 2 is a skirt portion, and 3 is a liner.

DETAILED DESCRIPTION OF THE INVENTION

Figure 1:
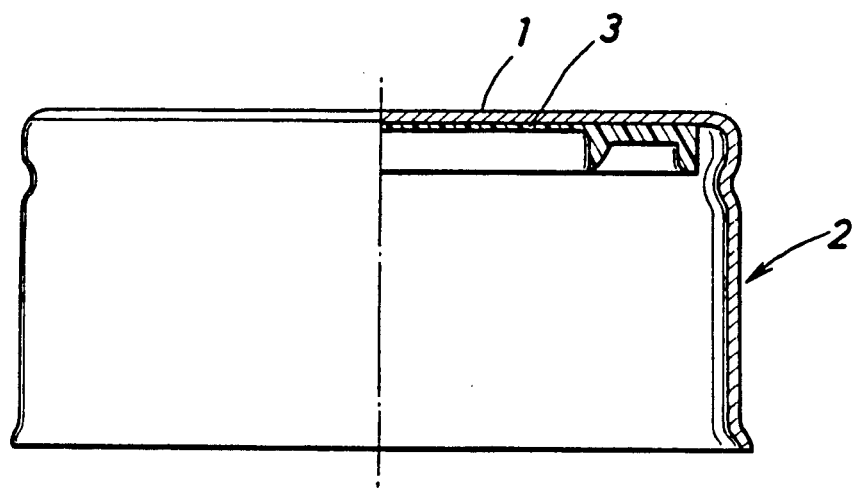
FIG. 1 is an explanatory view illustrating the liner-provided vessel closure of the present invention.

The liner used in the present invention is formed from a composition containing a hydrogenated styrene/butadiene block copolymer, and the first characteristic feature of the present invention is that the melt index of this hydrogenated styrene/butadiene copolymer is smaller than 0.1 g/10 min, especially smaller than 0.01 g/10 min. An ordinary hydrogenated styrene/butadiene block copolymer customarily used as a thermoplastic elastomer has a melt index (M.I.) of 0.1 to 10 g/10 min, and therefore, it is seen that the hydrogenated block copolymer used in the present invention has very small MI and has an extremely high molecular weight and a very low melt flowability. The present invention is based on the finding that this hydrogenated block copolymer having such a small melt index as mentioned above gives extremely small compression permanent strain and permanent elongation under heat sterilization temperature conditions when formed into a liner, and therefore, even if a divergence is caused between the liner and the vessel mouth by thermal deformation or thermal shrinkage, leakage is effectively prevented.

This hydrogenated styrene/butadiene copolymer having a very small melt index is hard and poor in the softness and the rubbery elasticity, that is, the cushioning property, is very low, and the hydrogenated copolymer has no substantial aptitude to a liner. Furthermore, the hydrogenated block copolymer is extremely inferior in the adaptability to heat forming, for example, the melt extrudability. The second characteristic feature of the present invention is that liquid paraffin and a propylene resin are incorporated in combination in this hydrogenated block copolymer having a very small melt index. It was found that if liquid paraffin and a propylene resin are incorporated in the hydrogenated block copolymer having a very small melt index, the softness, cushioning property and melt extrusion moldability can be prominently improved without loss of an excellent heat resistance inherently possessed by the hydrogenated block copolymer, especially a small compression permanent strain or permanent elongation at a high temperature. Among various oiling agents, liquid paraffin is especially excellent in the compatibility with the hydrogenated block copolymer having a very small melt index and the spreading property, and liquid paraffin is suitable for imparting a softness and a cushioning property to a liner of the final composition. The propylene resin is effective for imparting heat-forming characteristics (such as extrusion moldability, injection moldability and compression moldability) to a liner of the final composition. If an olefin resin other than the propylene resin, for example, polyethylene, is incorporated, reduction of the heat resistance cannot be avoided.

In the composition of the present invention, it is indispensable that (i) the hydrogenated block copolymer having a very small melt index should be present in an amount of 10 to 60% by weight, especially 20 to 55% by weight, (ii) the liquid paraffin should be present in an amount of 20 to 80% by weight, especially 30 to 60% by weight, and (iii) the propylene resin should be present in an amount of 5 to 60% by weight, especially 10 to 40% by weight. If the amount of the component (i) is too small and below the above-mentioned range, such liner characteristics as cushioning property and sealing property are degraded, and the heat resistance is reduced and especially, the compression permanent strain or permanent elongation at high temperature tends to increase. If the amount of the component (ii) is too small and below the above-mentioned range, the softness or rubbery elasticity is insufficient, and if the amount of the component (ii) exceeds the above-mentioned range, the mechanical properties and heat resistance of the liner are degraded. If the amount of the component (iii) is too small and below the above-mentioned range, the adaptability to the melt-forming operation is degraded, and if the amount of the component (iii) exceeds the above-mentioned range, the cushioning property and sealing property of the liner are degraded.

The hydrogenated styrene/butadiene block copolymer used in the present invention contains 10 to 60% by weight, especially 20 to 55% by weight, of styrene polymer blocks (A), and butadiene polymer blocks (B) are contained in the remaining amount. The butadiene polymer blocks (B) are hydrogenated, and it is preferred that the degree of hydrogenation be at least 85%, especially at least 90%. The bonding type of A-B-A is most preferred as the bonding type of both the polymer blocks, but the bonding types of B-A-B and A-B are preferably adopted.

It is preferred that the viscosity of the liquid paraffin used in the present invention be 50 to 400 cSt (37.8° C.), especially 150 to 300 cSt.

Isotactic polypropylene having a melt index of 2 to 20 g/10 min, especially 5 to 15 g/10 min, preferably used as the propylene resin. A propylene/ethylene copolymer, a propylene/butene-1 copolymer and a propylene/ethylene/butene-1 copolymer can be used as the propylene resin, so far as the content of propylene is at least 95% by weight based on the total constituent olefins.

Known additives can be incorporated into the liner resin composition used in the present invention according to known recipes. For example, in order to adjust the opening torque to an easy-open level, a fatty acid, a fatty acid derivative such as an amide, or a wax or other lubricant can be incorporated. Moreover, in order to color or opacify the liner, a white pigment such as titanium dioxide or a coloring pigment such as carbon black, red iron oxide or Tartrazine Lake can be incorporated. Moreover, a filler such as calcium carbonate, talc, clay or barium sulfate can be incorporated for adjusting the physical properties. Furthermore, a blocking-preventing agent such as silica can be added for preventing blocking, and an antioxidant such as a sterically hindered phenol can be added for preventing thermal deterioration at the liner-forming step or the heat sterilization step.

Optional means can be adopted for forming the above-mentioned resin composition into a liner. For example, there can be adopted a forming method in which the above-mentioned components are melt-kneaded, a predetermined amount of the kneaded composition is extruded to the inner side of a vessel closure shell and the resin composition is pressed by a mold under cooling, whereby a liner is formed in situ. This forming method is advantageous because a thick portion having an increased thickness desirable for attaining a good sealing property is formed in the peripheral portion of the liner to be engaged with the vessel mouth. Of course, instead of the method in which the resin composition is directly melt-extruded into the shell of a vessel closure, there can be adopted a method in which the composition is formed into a preform having a disc-like shape or other shape, this preform is filled into the shell of a vessel closure, the shell and composition are heated and the composition is molded into a liner.

Alternatively, there can be adopted a method in which the above-mentioned resin composition is formed into a sheet by melt extrusion or roll molding, the sheet is punched into a disc, and these discs are supplied one by one into vessel closure shells. In this case, the liner-forming sheet can be a single-layer sheet composed of the resin composition of the present invention or a laminate sheet in which at least a surface layer to be engaged with the vessel mouth is composed of the resin composition of the present invention. This laminate can be prepared by bonding a layer of the olefin resin composition to a substrate composed of a paper, an aluminum foil, a foamed sheet or a polyester film such as Myler by such means as dry lamination, extrusion coating or co-extrusion.

The metal material constituting the vessel closure shell can be a light metal such as aluminum or a plated steel sheet such as a tin-deposited steel sheet or an electrolytically chromate-treated steel sheet (tin-free steel sheet). The metal material can be coated with a known protecting paint, for example, an epoxy-phenolic paint.

Formation of the coated metal sheet into a shell can easily be accomplished by draw forming, deep draw forming, draw ironing forming or press forming. Bonding of the liner to the inner side of the vessel closure shell can easily be accomplished through a layer of an adhesive containing oxidized polyethylene or an acid-modified olefin resin.

In the present invention, of course, the vessel closure shell can be formed of a plastic material such as polypropylene. In this case, good bonding is attained between the liner and the vessel closure shell.

The present invention can be applied to an optional vessel closure in which opening of the vessel closure is effected by relative rotation of the closure and vessel. For example, the present invention can be applied to a screw cap, a pilfer-proof cap, a lug cap, a press-on twist-off cap and a twist crown. Clamping or sealing of the vessel closure to the mouth or neck of a vessel can be accomplished by the roll-on operation (screwing by a threaded roller), the press-on operation or the screw-on operation.

According to the present invention, by selecting a hydrogen styrene/butadiene block copolymer having a melt index smaller than 0.1 g/10 min as the liner-constituting material in a liner-provided vessel closure and incorporating liquid paraffin and a propylene resin in combination into this hydrogenated block copolymer having a very small melt index, there can be obtained a liner composition which is excellent in the combination of the heat resistance inherently possessed by the hydrogenated block copolymer having a very small melt viscosity, the softness, the cushioning property and the adaptability to the melt-molding operation.

In this liner, the compression permanent strain and permanent elongation under heat sterilization temperature conditions are very small, and therefore, even if a divergence is produced between the liner and the vessel mouth by thermal deformation or thermal shrinkage, leakage can be effectively prevented. Moreover, although this liner has the above-mentioned high heat resistance, the liner is rich in the softness and cushioning property and the Shore A hardness is maintained in a range of from 40 to 90. Still further, although the liner contains the oil component, surprisingly, no rise of the oil occurs, and the liner is excellent in the flavor-retaining property. Abnormal reduction of the opening torque or abnormal increase of the opening torque during the storage is not caused, and the opening torque can easily be adjusted by incorporation of a small amount of a lubricant. In addition, since the adaptability to the melt-forming operation is good, a liner-provided vessel closure can be prepared by the in-shell molding in which a high efficiency is attained.

The present invention will now be described in detail with reference to the following example that by no means limits the scope of the invention.

EXAMPLE

A sample resin blend was melt-extruded by using an extruder, and a predetermined amount (about 0.3 g) of the melt was hot-cut and inserted into a shell of a heated 28-mm aluminum cap, and immediately, the melt was pressed by a pressing mold being cooled to obtain a liner having a predetermined shape.

The obtained sample cap was subjected to the following experiment.

A 28-mm PET bottle (having a capacity of 1.5 l), to which a heat resistance was given by crystallization of the mouth portion, was filled with hot water maintained at 95° C. and was then sealed by the sample cap (the capping pressure was 180 kg/bottle). Sterilization was carried out at 90° C. for 30 minutes, and the bottle was cooled and leakage was checked. The bottle where leakage was not observed was let to fall down in the inverted state on a circular column at an angle of 10° from a height of 10 cm, 20 cm or 30 cm, and leakage was checked again. Separately, a 28-mm glass bottle (having a capacity of 500 ml) was filled with water maintained at 90° C. and sealed with the sample cap, and the retort treatment was carried out at 121° C. for 30 minutes. Then, the bottle was naturally cooled and the falling test was carried out in the same manner as described above.

The composition and obtained results are shown in Table 1.

Incidentally, in Table 1, runs 1 through 4 are runs according to the present invention while runs 5 through 10 are comparative runs.

TABLE 1

|  | Runs of Present Invention | | | | Comparative Runs | | | | | |
| --- | --- | --- | --- | --- | --- | --- | --- | --- | --- | --- |
|  | 1 | 2 | 3 | 4 | 5 | 6 | 7 | 8 | 9 | 10 |
| Composition (parts by weight) | | | | | | | | | | |
| SEBS (MI < 0.1) | 20 | 40 | 55 | 30 | 70 | — | — | 70 | 50 | — |
| SEBS (MI = 8) | — | — | — | — | — | 40 | 70 | — | — | 40 |
| PP (MI = 10) | 45 | 20 | 10 | 5 | 30 | 40 | 30 | — | — | 20 |
| liquid paraffin | 35 | 40 | 35 | 65 | — | 20 | — | 30 | 50 | 40 |
| other additives | 1.5 | 1.5 | 1.5 | 1.5 | 1.5 | 1.5 | 1.5 | 1.5 | 1.5 | 1.5 |
| PET Bottles | | | | | | | | | | |
| leakage after sealing | 0/10 | 0/10 | 0/10 | 0/10 | 7/10 | 5/10 | 0/10 | 0/10 | 0/10 | 0/10 |
| falling test | | | | | | | | | | |
| 10 cm | 0/10 | 0/10 | 0/10 | 0/10 | 10/10 | 10/10 | 6/10 | 5/10 | 0/10 | 0/10 |
| 20 cm | 0/10 | 0/10 | 0/10 | 0/10 | — | — | 10/10 | 7/10 | 2/10 | 3/10 |
| 30 cm | 1/10 | 0/10 | 0/10 | 0/10 | — | — | — | 10/10 | 4/10 | 5/10 |
| Glass bottles | | | | | | | | | | |
| leakage after sealing | 0/10 | 0/10 | 0/10 | 0/10 | 1/10 | 2/10 | 3/10 | 0/10 | 0/10 | 0/10 |
| falling test | | | | | | | | | | |
| 10 cm | 0/10 | 0/10 | 0/10 | 0/10 | 6/10 | 10/10 | 10/10 | 1/10 | 0/10 | 3/10 |
| 20 cm | 0/10 | 0/10 | 0/10 | 0/10 | 10/10 | — | — | 3/10 | 1/10 | 7/10 |
| 30 cm | 2/10 | 0/10 | 0/10 | 0/10 | — | — | — | 7/10 | 5/10 | 10/10 |

Note
SEBS (MI < 0.1): hydrogenated styrene/butadiene block copolymer having a styrene content of 30% by weight
SEBS (MI = 8): hydrogenated styrene/butadiene block copolymer having a styrene content of 15% by weight
PP (MI = 10): polypropylene having a density of 0.91
liquid paraffin: having a viscosity of 65 cSt and a specific gravity of 0.866
other additives: lubricant (fatty acid amide or the like), colorant (titanium oxide), and metal soap (calcium stearate or the like)

What is claimed is:

1. A liner-provided vessel closure comprising a vessel closure shell and a liner formed on the inner face side of a top plate of the shell, wherein the liner is formed from a composition consisting essentially of (i) 10 to 60% by weight of a hydrogenated styrene/butadiene block copolymer having a melt index smaller than 0.1 g/10 min as determined at a temperature of 200° C. under a load of 5 kg, (ii) 20 to 80% by weight of liquid paraffin and (iii) 5 to 60% by weight of a propylene resin.

2. A liner-provided vessel closure as set forth in claim 1, wherein the liquid paraffin has a viscosity of 50 to 400 cSt as measured at 37.8° C.

3. A liner-provided vessel closure as set forth in claim 1, wherein the propylene resin is isotactic polypropylene having a melt index of 2 to 20 g/10 min.

4. A liner-provided vessel closure as set forth in claim 1, wherein the hydrogenated styrene/butadiene block copolymer contains 10 to 50% by weight of styrene blocks and has a hydrogenation degree of at least 85%.

5. A liner-provided vessel closure as set forth in claim 1, wherein the composition consists essentially of (i) 20 to 55% by weight of a hydrogenated styrene/butadiene block copolymer having a melt index smaller than 0.1 g/10 min as determined at a temperature of 200° C. under a load of 5 kg, (ii) 30 to 60% by weight of liquid paraffin and (iii) 10 to 40% by weight of a propylene resin.

6. A liner-provided vessel closure as set forth in claim 1, wherein the hydrogenated styrene/butadiene block copolymer has a melt index smaller than 0.01 g/10 min as determined at a temperature of 200° C. under a load of 5 kg.

7. A liner-provided vessel closure as set forth in claim 1, wherein the hydrogenated styrene/butadiene block copolymer is present in an amount of 20 to 55% by weight.

8. A liner-provided vessel closure as set forth in claim 1, wherein the liquid paraffin is present in an amount of 30 to 60% by weight.

9. A liner-provided vessel closure as set forth in claim 1, wherein the propylene resin is present in an amount of 10 to 40% by weight.

10. A liner-provided vessel closure as set forth in claim 2, wherein the liquid paraffin has a viscosity of 150 to 300 cSt as measured at 37.8° C.

11. A liner-provided vessel closure as set forth in claim 3, wherein the isotactic polypropylene has a melt index of 5 to 15 g/10 min.

* * * * *